(12) United States Patent
Keates et al.

(10) Patent No.: US 10,291,047 B2
(45) Date of Patent: May 14, 2019

(54) ADAPTIVE STEP AND CHARGE CURRENT BATTERY CHARGING

(71) Applicant: Intel Corporation, Santa Clara, CA (US)

(72) Inventors: Andy Keates, Los Gatos, CA (US); Naoki Matsumura, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 14/316,331

(22) Filed: Jun. 26, 2014

(65) Prior Publication Data

US 2015/0380953 A1 Dec. 31, 2015

(51) Int. Cl.
*H01M 10/48* (2006.01)
*H02J 7/00* (2006.01)
*H02J 7/04* (2006.01)
*H01M 10/44* (2006.01)

(52) U.S. Cl.
CPC ............. *H02J 7/007* (2013.01); *H01M 10/44* (2013.01); *H01M 10/48* (2013.01); *H02J 7/0052* (2013.01); *H02J 7/0073* (2013.01); *H02J 7/041* (2013.01); *H02J 7/045* (2013.01); *H01M 10/446* (2013.01)

(58) Field of Classification Search
CPC ......... H02J 7/007; H02J 7/0052; H02J 7/0055
See application file for complete search history.

(56) References Cited

U.S. PATENT DOCUMENTS

| 2011/0012563 | A1 | 1/2011 | Paryani et al. |
| 2011/0037438 | A1 | 2/2011 | Bhardwaj et al. |
| 2011/0037439 | A1 | 2/2011 | Bhardwaj et al. |
| 2012/0043929 | A1 | 2/2012 | Yazami |
| 2012/0086406 | A1 | 4/2012 | Maeagawa |

(Continued)

FOREIGN PATENT DOCUMENTS

| CN | 101071887 A | 11/2007 |
| CN | 101308943 A | 11/2008 |

(Continued)

OTHER PUBLICATIONS

International Search Report for International Application No. PCT/US2015/035323, dated Aug. 27, 2015, 3 pages.

(Continued)

*Primary Examiner* — Drew A Dunn
*Assistant Examiner* — Sailesh Thapa
(74) *Attorney, Agent, or Firm* — Jordan IP Law, LLC (57) ABSTRACT

Systems and methods may place a battery in a first constant voltage charging mode and monitoring a diminishing current of the battery while the battery is in the first constant voltage charging mode. Additionally, the battery may be placed in a constant current charging mode when the diminishing current falls to a first predetermined threshold. In one example, a rising voltage of the battery is monitored while the battery is in the constant current charging mode and the battery is placed in a second constant voltage charging mode at an end of the charge cycle in response to the rising voltage reaching a second predetermined threshold. Moreover, a charge current corresponding to the constant current charging mode may be adjusted based on a charge capacity of the battery.

25 Claims, 4 Drawing Sheets

(56) References Cited

U.S. PATENT DOCUMENTS

| | | | | |
|---|---|---|---|---|
| 2012/0280663 A1* | 11/2012 | Lim | .................... | H02J 7/0083 320/149 |
| 2013/0082643 A1* | 4/2013 | Cha | .................... | H02J 7/0068 320/107 |
| 2014/0077815 A1* | 3/2014 | Mattisson | ............ | G01R 31/361 324/426 |
| 2014/0203781 A1* | 7/2014 | Yun | ........................ | H02J 7/042 320/112 |
| 2014/0320085 A1* | 10/2014 | Chang | .................. | H02J 7/0081 320/112 |
| 2016/0028254 A1* | 1/2016 | Honoki | ................ | H01M 10/44 320/162 |

FOREIGN PATENT DOCUMENTS

| | | | |
|---|---|---|---|
| JP | 2008252960 A | 10/2008 | |
| JP | 2009033825 A | 2/2009 | |
| JP | 2009033843 A | 2/2009 | |
| JP | 2011024412 A | 2/2011 | |
| WO | 2007040948 A2 | 4/2007 | |
| WO | WO 2014194811 A1 * | 12/2014 | ............ H02J 7/0057 |

OTHER PUBLICATIONS

Written Opinion of the International Search Report for International Application No. PCT/US2015/035323, dated Aug. 27, 2015, 7 pages.
Extended European Search Report for European Patent Application No. 15811988.3 dated Jan. 23, 2018, 8 Pages.
Office Action for Japanese Patent Application No. 2017-510469 dated Oct. 24, 2017, 7 pages including 3 pages of English translation.
Office Action for Japanese Patent Application No. 2017-510469 dated Feb. 6, 2018, 5 pages including 2 pages of English translation.
International Preliminary Report on Patentability for International Application No. PCT/US2015/035323 dated Jan. 5, 2017, 8 pages.

* cited by examiner

ADAPTIVE STEP AND CHARGE CURRENT BATTERY CHARGING

TECHNICAL FIELD

Embodiments generally relate to battery charging. More particularly, embodiments relate to adaptive step and adaptive charge current approaches to battery charging.

BACKGROUND

Conventional "step charging" approaches may begin a battery charging cycle by placing the battery in a constant current charging ("CC") mode at a relatively high current level for a brief period of time and then reducing the current level of the constant current charging mode in order to prevent damage to the electrodes of the battery, wherein the lower current level may typically remain fixed over the life of the battery. Such an approach may result in a loss in charging momentum due to a voltage drop that occurs immediately after the change in current level. Moreover, as the number of charge cycles encountered by the battery increases, the full-charge capacity of the battery typically decreases. Thus, charging the battery at the same CC current level over the life of the battery may cause damage to the battery and increase capacity fade.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1A:
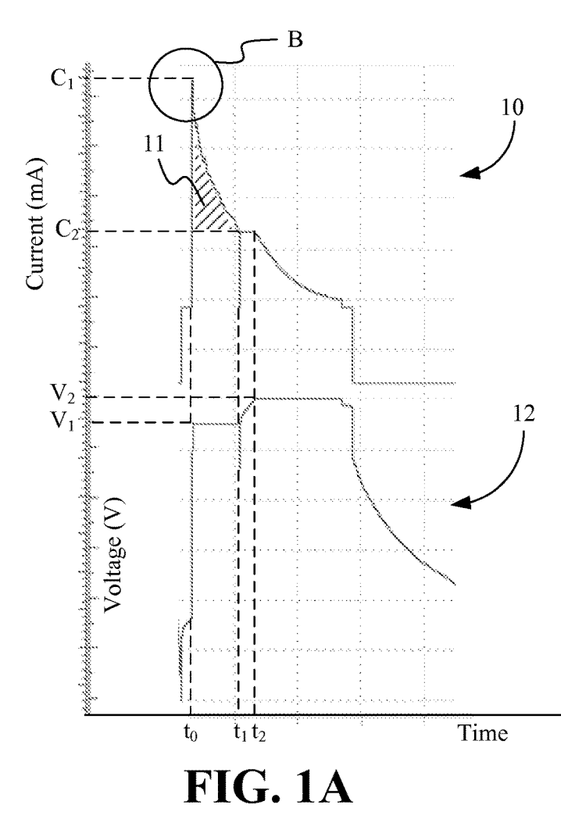
FIG. 1A is a plot of an example of a set of charging curves according to an embodiment.
Figure 1B:
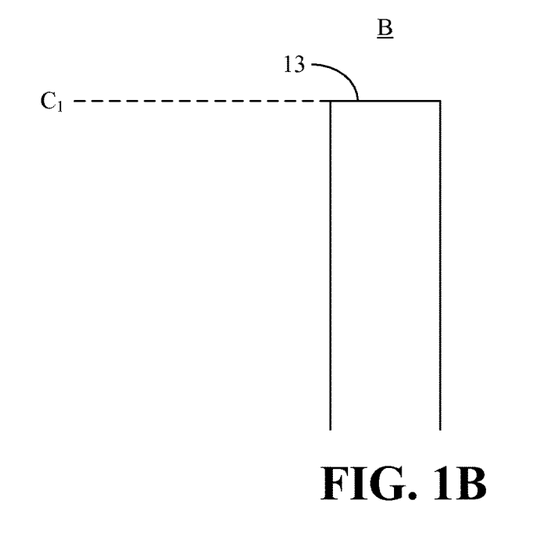
FIG. 1B is an enlarged view of an example of region B in FIG. 1A.

Turning now to FIGS. 1A and 1B, a set of charging curves is shown in which a current curve 10 reflects the current level of a battery (e.g., lithium-ion/Li-ion battery) being charged and a voltage curve 12 reflects the voltage level of the battery being charged. In the illustrated example, the discharged battery is placed in a constant current charging mode (e.g., initial burst charge) at the beginning of the charge cycle, at current $C_1$ (e.g., time $t_0$) and maintaining a brief plateau 13 in the current curve 10. The illustrated initial burst charge causes the battery cell voltage to quickly rise to a limit $V_1$. At this point in the charging cycle the battery cell is held in a constant voltage charging mode, which may result in the voltage of the battery remaining at a relatively constant voltage level $V_1$ (e.g., 4.1V), while the current of the battery may peak at a relatively high current level $C_1$ (e.g., 3 A) and then gradually diminish.

By permitting the current to diminish gradually over time, the illustrated approach adaptively maintains the charging momentum established at the beginning of the charge cycle and effectively reduces the amount of time needed to charge the battery. More particularly, a region 11 in the current curve may represent the additional amount of charge delivered to the battery as a result of the additional charging momentum, as compared to a more traditional approach of simply decreasing the charge current to current $C_2$ immediately upon reaching voltage threshold $V_1$. Additionally, the size and shape of the region 11 may automatically adapt itself as the charge capacity and internal chemistry of the battery changes over the life of the battery.

At time $t_1$, the illustrated diminishing current falls to a predetermined threshold (e.g., $C_2$), and the battery is placed in a constant current charging mode. The constant current charging mode may hold the current of the battery at the predetermined threshold and cause the voltage of the battery to rise. When the voltage of the battery reaches the targeted voltage level $V_2$ (e.g., 4.2V at time $t_2$), the battery may be returned to a constant voltage charging mode in which the voltage of the battery is held at the targeted voltage level $V_2$. The battery may remain in the constant voltage charging mode until the battery reaches a full-charge state and the current drops to some nominal value.

Figure 2:
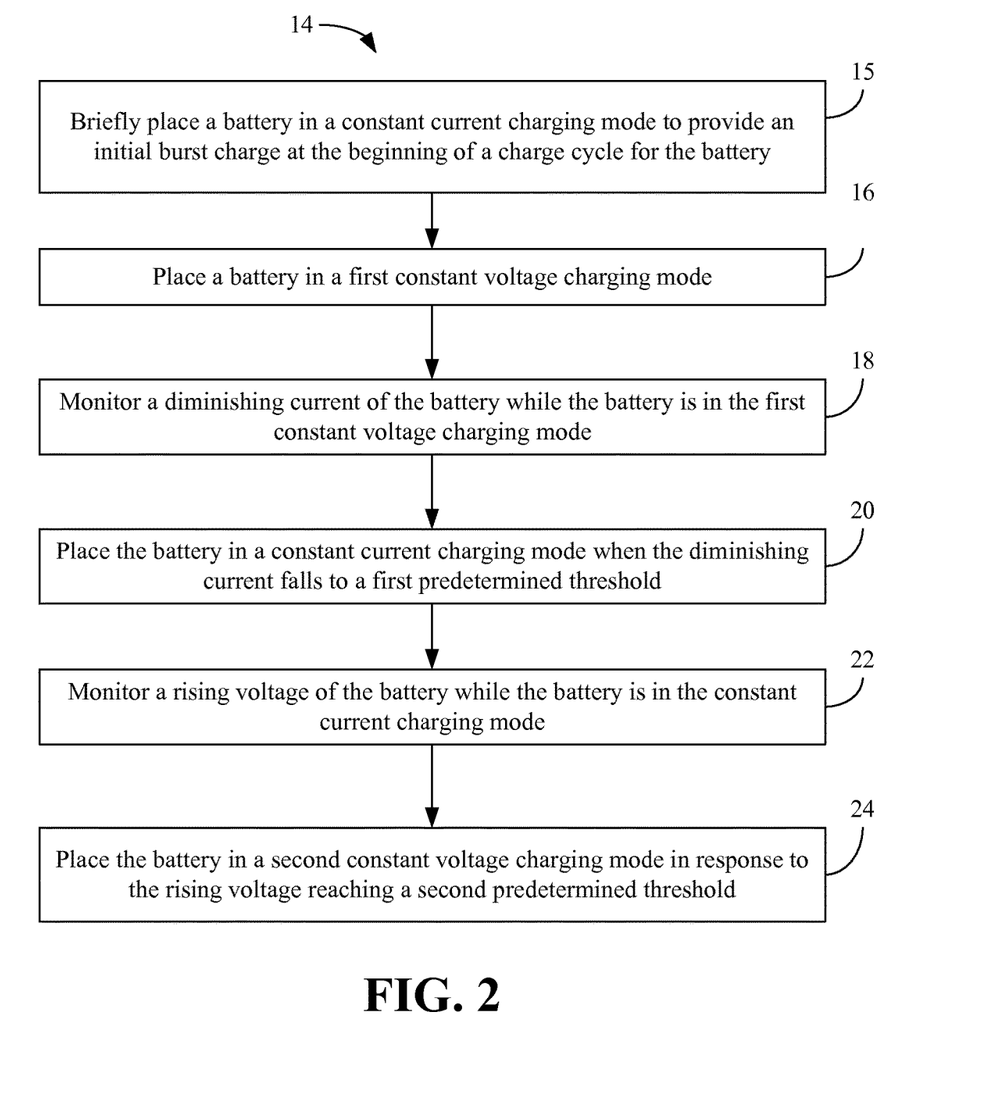
FIG. 2 is a flowchart of an example of a method of charging a battery according to an embodiment.

Turning now to FIG. 2, a method 14 of charging a battery is shown. The method 14 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Illustrated processing block 15 provides for briefly placing a battery in a constant current charging mode to provide an initial burst charge at the beginning of a charge cycle for the battery. Block 16 may placing the battery in a first constant voltage charging mode after the initial constant current charge has caused the battery voltage to rise to the initial charge voltage step. Additionally, a diminishing current of the battery may be monitored at block 18 while the battery is in the first constant voltage charging mode. Illustrated block 20 places the battery in a constant current charging mode when the diminishing current falls to a first predetermined threshold. As already noted, the constant current charging mode may involve holding the charging current at the first predetermined threshold. A rising voltage of the battery may be monitored at block 22 while the battery is in the constant current charging mode, wherein the battery is placed in a second constant voltage charging mode at illustrated block 24 in response to the rising voltage reaching a second predetermined threshold (e.g., targeted voltage level).

With further regard to the charge current associated with the constant current charging mode, the rate of charge and discharge may be related to the size of the battery cell using a "C-rate". For example, a C-rate of 1 C may be the current that would deplete a fully charged cell in one hour. Thus, a cell with a capacity of, for example, 2 Ah would need a current of 2 A to deplete in one hour, wherein a C-rate of 1 C for the cell would correspond to a charge current of 2 A, a C-rate of 2 C would correspond to a charge current of 4 A, and so forth. The full-charge capacity of a battery may decrease when the battery charge and discharge sequences are repeated (e.g., the battery is cycled). Accordingly, one approach to preventing damage to the battery and slowing battery capacity fade may be to adjust the charge current corresponding to the constant current charging mode based on the charge capacity of the battery so that a constant C-rate is maintained for the battery.

Figure 3:
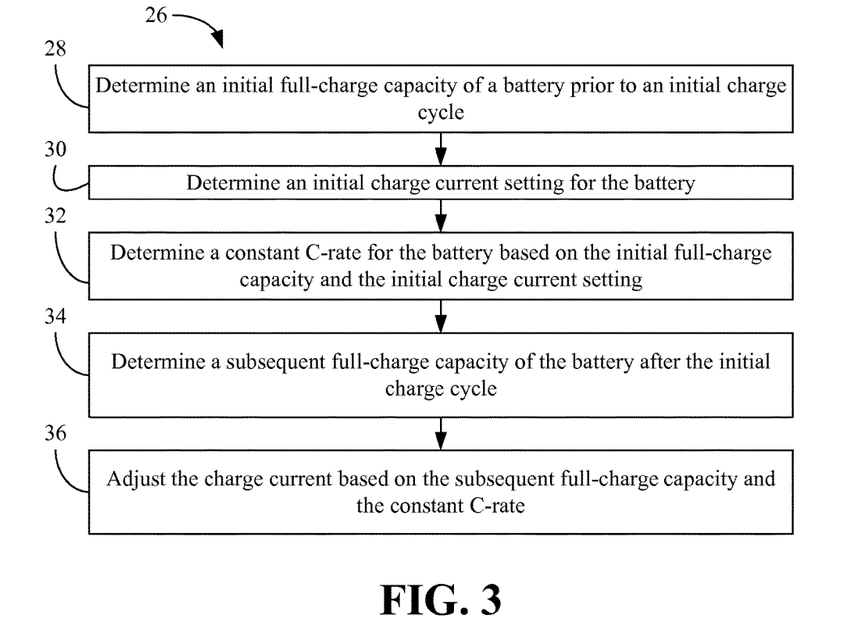
FIG. 3 is a flowchart of an example of a method of adapting charge current to full-charge capacity according to an embodiment.

For example, FIG. 3 shows a method 26 of adapting charge current to full-charge capacity. The method 26 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 28 provides for determining the initial full-charge capacity (e.g., "x" Ah) of a battery (e.g., a fresh cell) prior to an initial charge cycle. Block 28 may involve taking a capacity measurement of the battery, consulting a system specification, etc. Additionally, an initial charge current setting (e.g., "y" Amps) may be determined for the battery at block 30, wherein block 30 might include accessing system firmware, registers, etc., depending on the circumstances. Illustrated block 32 determines a C-rate (e.g., y/x) for the battery based on the initial full-charge capacity and the initial charge current setting. Thus, if, for example, the initial full-charge capacity of the battery is 2 Ah and the initial charge current setting for the battery is 2 A, the C-rate may determined to be 1 C (e.g., 2 A/2 Ah=1 C). As will be discussed in greater detail, the C-rate may be maintained as a constant as the full-charge capacity of the battery decreases over the life of the battery. Such an approach may substantially reduce the rate of battery capacity fade.

More particularly, block 34 may determine a subsequent full-charge capacity (e.g., "z" Ah) of the battery after the initial charge cycle. Block 34 may therefore involve taking a capacity measurement of the battery similarly as in the case of block 28. Illustrated block 36 adjusts the charge current (e.g., z*y/x) based on the subsequent full-charge capacity and the constant C-rate. Thus, if, in the above example, the subsequent full-charge capacity is 1 Ah, the adjusted charge current might be 1 A (e.g., 1 Ah*2 A/2 Ah=1 A). Accordingly, the adjusted charge current may be used to monitor the diminishing current of the first constant voltage charging mode as well as to place the battery in the constant current charging mode, as already discussed. The specific current and voltage values used herein are to facilitate discussion only and may vary depending on the circumstances. Moreover, the term "constant" may be used in reference to currents and voltages that vary slightly and/or negligibly from a particular value (e.g., the constant current charging mode may be considered a "constant current-type" charging mode and the constant voltage charging mode may be considered a "constant voltage-type" charging mode).

Figure 4:
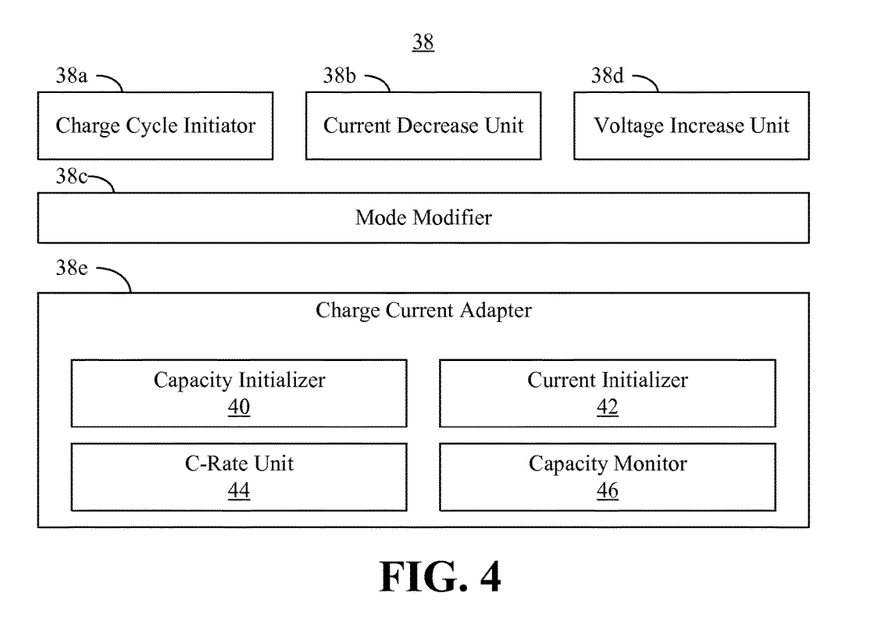
FIG. 4 is a block diagram of an example of a logic architecture according to an embodiment.

Turning now to FIG. 4, a logic architecture 38 (38a-38e) is shown, wherein the architecture 38 is capable of adaptively step charging a battery as well as adaptively selecting charge currents for a battery. The logic architecture 38, which may be implemented as logic instructions, configurable logic, fixed-functionality hardware logic, etc., or any combination thereof, may therefore conduct one or more of the operations described with respect to the method 14 (FIG. 2) and/or the method 26 (FIG. 3). In the illustrated example, a charge cycle initiator 38a applies an initial burst charge to the battery and places the battery in a first constant voltage charging mode in response to the initial burst charge causing the voltage of the battery to reach a level corresponding to the first constant voltage charging mode. Additionally, a current decrease unit 38b may monitor a diminishing current of the battery while the battery is in the first constant voltage charging mode. Thus, the illustrated approach may adaptively maintain the charging momentum established at the beginning of the charge cycle and effectively reduce the amount of time needed to charge the battery.

A mode modifier 38c may place the battery in a constant current charging mode when the diminishing current falls to a first predetermined threshold. As already noted, the first predetermined threshold may be the charge current level used for the constant current charging mode. Moreover, the charge current level corresponding to the constant current charging mode may be adjustable based on the full-charge capacity of the battery. The logic architecture 38 may also include a voltage increase unit 38d to monitor the rising voltage of the battery while the battery is in the constant voltage charging mode, wherein the mode modifier 38c may place the battery in a second constant voltage charging mode at the end of the charge cycle in response to the rising voltage reaching a second predetermined threshold.

In one example, the charge current adapter 38e includes a charge current adapter 38e that adjusts the charge current corresponding to the constant current charging mode based on the charge capacity of the battery. More particularly, the charge current adapter 38e may maintain a constant C-rate for the battery. Thus, the charge current adapter 38e might include a capacity initializer 40 configured to determine the initial full-charge capacity of the battery prior to an initial charge cycle. Additionally, a current initializer 42 may determine an initial charge current setting for the battery, wherein a C-rate unit 44 may determine a constant C-rate based on the initial full-charge capacity and the initial charge current setting. The illustrated logic architecture 38 also includes a capacity monitor 46 to determine subsequent full-charge capacities of the battery after the initial charge cycle, wherein the charge current is to be adjusted based on the subsequent full-charge capacities and the constant C-rate.

Figure 5:
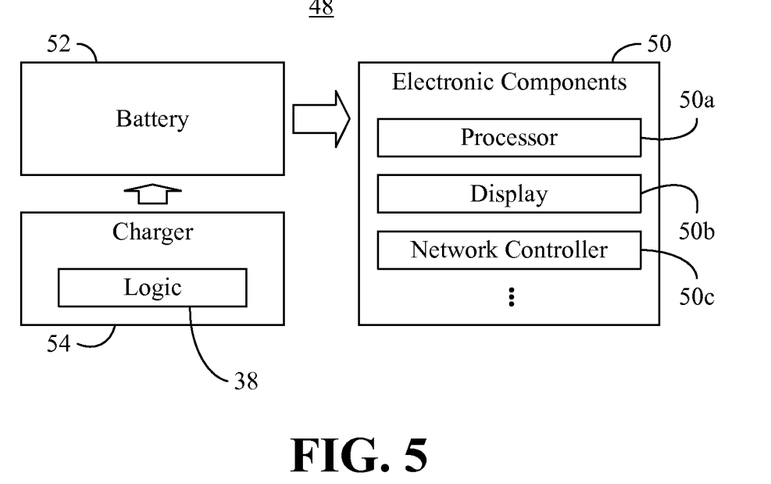
FIG. 5 is a block diagram of an example of a system according to an embodiment.

FIG. 5 shows a computing system 48 that may be part of a device having computing functionality (e.g., personal digital assistant/PDA, notebook computer, tablet computer, convertible tablet, desktop computer, cloud server), communications functionality (e.g., wireless smart phone), imaging functionality, media playing functionality (e.g., smart television/TV), wearable functionality (e.g., clothing, jewelry, eyewear, headwear) or any combination thereof (e.g., mobile Internet device/MID). In the illustrated example, the system 48 includes a plurality of electronic components 50 (50a-50c) such as, for example, a processor 50a, display 50b, network controller 50c, and so forth. In one example, the system 48 is powered by a battery 52 (e.g., Li-ion battery), which may be charged by a charger 54. The illustrated charger 54 includes the logic architecture 38 already described above with regard to FIG. 4. Therefore, the charger 54 may be configured to determine the initial full-charge capacity of the battery 52 prior to an initial charge cycle, determine an initial charge current setting for the battery, and determine a C-rate for the battery based on the initial full-charge capacity and the initial charge current setting, wherein the C-rate may be maintained as a constant for charge cycles after the initial charge cycle.

The charger 54 may also place the battery 52 in a first constant voltage charging mode at the beginning of a charge cycle for the battery, monitor a diminishing current of the battery while the battery is in the first constant voltage charging mode, and place the battery in a constant current charging mode when the diminishing current falls to a first predetermined threshold (e.g., the adaptive charge current level used for the constant current charging mode). Additionally, the charger 54 may monitor a rising voltage of the battery while the battery is in the constant current charging mode and place the battery in a second constant voltage charging mode at the end of the charge cycle in response to the rising voltage reaching a second predetermined threshold (e.g., targeted voltage).

Additional Notes and Examples

Example 1 may include a battery operated system comprising one or more electronic components, a battery to supply power to the one or more electronic components, and a charger coupled to the battery, the charger including a charge cycle initiator to place the battery in a first constant voltage charging mode, a current decrease unit to monitor a diminishing current of the battery while the battery is in the first constant voltage charging mode, and a mode modifier to place the battery in a constant current charging mode when the diminishing current falls to a first predetermined threshold.

Example 2 may include the system of Example 1, wherein the charger further includes a voltage increase unit to monitor a rising voltage of the battery while the battery is in the constant current charging mode, wherein the mode modifier is to place the battery in a second constant voltage charging mode at an end of the charge cycle in response to the rising voltage reaching a second predetermined threshold.

Example 3 may include the system of any one of Examples 1 or 2, wherein the charger further includes a charge current adapter to adjust a charge current corresponding to the constant current charging mode based on a charge capacity of the battery.

Example 4 may include the system of Example 3, wherein the charge current adapter is to maintain a constant C-rate for the battery.

Example 5 may include the system of Example 4, wherein the charge current adapter includes a capacity initializer to determine an initial full-charge capacity of the battery prior to an initial charge cycle, a current initializer to determine an initial charge current setting for the battery, and a C-rate unit to determine the constant C-rate based on the initial full-charge capacity and the initial charge current setting.

Example 6 may include the system of Example 5, wherein the charge current adapter further includes a capacity monitor to determine a subsequent full-charge capacity of the battery after the initial charge cycle, wherein the charge current is to be adjusted based on the subsequent full-charge capacity and the constant C-rate.

Example 7 may include a method of adaptively charging a battery, comprising placing the battery in a first constant voltage charging mode, monitoring a diminishing current of the battery while the battery is in the first constant voltage charging mode, and placing the battery in a constant current charging mode when the diminishing current falls to a first predetermined threshold.

Example 8 may include the method of Example 7, further including monitoring a rising voltage of the battery while the battery is in the constant current charging mode, and placing the battery in a second constant voltage charging mode at an end of the charge cycle in response to the rising voltage reaching a second predetermined threshold.

Example 9 may include the method of any one of Examples 7 or 8, further including adjusting a charge current corresponding to the constant current charging mode based on a charge capacity of the battery.

Example 10 may include the method of Example 9, wherein adjusting the charge current includes maintaining a constant C-rate for the battery.

Example 11 may include the method of Example 9, further including determining an initial full-charge capacity of the battery prior to an initial charge cycle, determining an initial charge current setting for the battery, and determining the constant C-rate based on the initial full-charge capacity and the initial charge current setting.

Example 12 may include the method of Example 11, further including determining a subsequent full-charge capacity of the battery after the initial charge cycle, wherein the charge current is adjusted based on the subsequent full-charge capacity and the constant C-rate.

Example 13 may include at least one computer readable storage medium comprising a set of instructions which, when executed by a computing device, cause the computing device to place a battery in a first constant voltage charging mode, monitor a diminishing current of the battery while the battery is in the first constant voltage charging mode, and place the battery in a constant current charging mode when the diminishing current falls to a first predetermined threshold.

Example 14 may include the at least one computer readable storage medium of Example 13, wherein the instructions, when executed, cause a computing device to monitor a rising voltage of the battery while the battery is in the constant current charging mode, and place the battery in a second constant voltage charging mode at an end of the charge cycle in response to the rising voltage reaching a second predetermined threshold.

Example 15 may include the at least one computer readable storage medium of any one of Examples 13 or 14, wherein the instructions, when executed, cause a computing device to adjust a charge current corresponding to the constant current charging mode based on a charge capacity of the battery.

Example 16 may include the at least one computer readable storage medium of Example 15, wherein the instructions, when executed, cause a computing device to maintain a constant C-rate for the battery.

Example 17 may include the at least one computer readable storage medium of Example 15, wherein the instructions, when executed, cause a computing device to determine an initial full-charge capacity of the battery prior to an initial charge cycle, determine an initial charge current setting for the battery, and determine the constant C-rate based on the initial full-charge capacity and the initial charge current setting.

Example 18 may include the at least one computer readable storage medium of Example 17, wherein the instructions, when executed, cause a computing device to determine a subsequent full-charge capacity of the battery after the initial charge cycle, wherein the charge current is adjusted based on the subsequent full-charge capacity and the constant C-rate.

Example 19 may include an adaptive charging apparatus comprising a charge cycle initiator to place a battery in a first constant voltage charging mode, a current decrease unit to monitor a diminishing current of the battery while the battery is in the first constant voltage charging mode, and a mode modifier to place the battery in a constant current charging mode when the diminishing current falls to a first predetermined threshold.

Example 20 may include the apparatus of Example 19, further including a voltage increase unit to monitor a rising voltage of the battery while the battery is in the constant current charging mode, wherein the mode modifier is to place the battery in a second constant voltage charging mode at an end of the charge cycle in response to the rising voltage reaching a second predetermined threshold.

Example 21 may include the apparatus of any one of Examples 19 or 20, further including a charge current adapter to adjust a charge current corresponding to the constant current charging mode based on a charge capacity of the battery.

Example 22 may include the apparatus of Example 21, wherein the charge current adapter is to maintain a constant C-rate for the battery.

Example 23 may include the apparatus of Example 21, wherein the charge current adapter includes a capacity initializer to determine an initial full-charge capacity of the battery prior to an initial charge cycle, a current initializer to determine an initial charge current setting for the battery, and a C-rate unit to determine the constant C-rate based on the initial full-charge capacity and the initial charge current setting.

Example 24 may include the apparatus of Example 23, wherein the charge current adapter further includes a capacity monitor to determine a subsequent full-charge capacity of the battery after the initial charge cycle, wherein the charge current is to be adjusted based on the subsequent full-charge capacity and the constant C-rate.

Example 25 may include the apparatus of any one of Examples 19 to 24, wherein the charge cycle initiator is to place the battery in the first constant voltage charging mode in response to an initial burst charge causing a voltage of the battery to reach a level corresponding to the first constant voltage charging mode.

Example 26 may include an adaptive charging apparatus comprising means for performing the method of any of Examples 7 to 12.

Thus, techniques described herein may substantially reduce charge times, particularly for aged battery cells having high internal impedance. For example, the charge current may be adjusted to automatically match the first "fast, but gentle" charge step and the abilities of the battery cell during the beginning of the charge cycle. Such an approach may enable benefits achieved at the beginning of the charge cycle to be maximized throughout the life of the battery. Techniques may also mitigate the acceleration of capacity fade by adaptively setting the charge current based on the full-charge capacity of the battery in order to maintain a constant C-rate.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   one or more electronic components;
   a battery to supply power to the one or more electronic components; and
   a charger coupled to the battery, the charger including:
   a charge cycle initiator to place the battery in a first constant voltage charging mode at a first predetermined voltage threshold during a beginning of a charging cycle;
   a current decrease unit to monitor a diminishing current of the battery while the battery is in the first constant voltage charging mode during the beginning of the charging cycle; and
   a mode modifier to place the battery in a constant current charging mode when the diminishing current falls to a first predetermined current threshold,
   wherein the mode modifier is to place the battery in a second constant voltage charging mode at an end of the charge cycle in response to a rising voltage reaching a second predetermined voltage threshold different from the first predetermined voltage threshold.

2. The system of claim 1, wherein the charger further includes a voltage increase unit to monitor a rising voltage of the battery while the battery is in the constant current charging mode.

3. The system of claim 1, wherein the charger further includes a charge current adapter to adjust a charge current corresponding to the constant current charging mode based on a charge capacity of the battery.

4. The system of claim 3, wherein the charge current adapter is to maintain a constant C-rate for the battery.

5. The system of claim 4, wherein the charge current adapter includes:
a capacity initializer to determine an initial full-charge capacity of the battery prior to an initial charge cycle;
a current initializer to determine an initial charge current setting for the battery; and
a C-rate unit to determine the constant C-rate based on the initial full-charge capacity and the initial charge current setting.

6. The system of claim 5, wherein the charge current adapter further includes a capacity monitor to determine a subsequent full-charge capacity of the battery after the initial charge cycle, wherein the charge current is to be adjusted based on the subsequent full-charge capacity and the constant C-rate.

7. A method comprising:
placing a battery in a first constant voltage charging mode at a first predetermined voltage threshold during a beginning of a charging cycle;
monitoring a diminishing current of the battery while the battery is in the first constant voltage charging mode during the beginning of the charging cycle; and
placing the battery in a constant current charging mode when the diminishing current falls to a first predetermined current threshold,
wherein the battery is placed in a second constant voltage charging mode at an end of the charge cycle in response to a rising voltage reaching a second predetermined voltage threshold different from the first predetermined voltage threshold.

8. The method of claim 7, further including:
monitoring a rising voltage of the battery while the battery is in the constant current charging mode.

9. The method of claim 7, further including adjusting a charge current corresponding to the constant current charging mode based on a charge capacity of the battery.

10. The method of claim 9, wherein adjusting the charge current includes maintaining a constant C-rate for the battery.

11. The method of claim 9, further including:
determining an initial full-charge capacity of the battery prior to an initial charge cycle;
determining an initial charge current setting for the battery; and
determining the constant C-rate based on the initial full-charge capacity and the initial charge current setting.

12. The method of claim 11, further including determining a subsequent full-charge capacity of the battery after the initial charge cycle, wherein the charge current is adjusted based on the subsequent full-charge capacity and the constant C-rate.

13. At least one non-transitory computer readable storage medium comprising a set of instructions which, when executed by a computing device, cause the computing device to:
place a battery in a first constant voltage charging mode at a first predetermined voltage threshold during a beginning of a charging cycle;
monitor a diminishing current of the battery while the battery is in the first constant voltage charging mode during the beginning of the charging cycle; and
place the battery in a constant current charging mode when the diminishing current falls to a first predetermined current threshold,
wherein the battery is placed in a second constant voltage charging mode at an end of the charge cycle in response to a rising voltage reaching a second predetermined voltage threshold different from the first predetermined voltage threshold.

14. The at least one non-transitory computer readable storage medium of claim 13, wherein the instructions, when executed, cause a computing device to:
monitor a rising voltage of the battery while the battery is in the constant current charging mode.

15. The at least one non-transitory computer readable storage medium of claim 13, wherein the instructions, when executed, cause a computing device to adjust a charge current corresponding to the constant current charging mode based on a charge capacity of the battery.

16. The at least one non-transitory computer readable storage medium of claim 15, wherein the instructions, when executed, cause a computing device to maintain a constant C-rate for the battery.

17. The at least one non-transitory computer readable storage medium of claim 15, wherein the instructions, when executed, cause a computing device to:
determine an initial full-charge capacity of the battery prior to an initial charge cycle;
determine an initial charge current setting for the battery; and
determine the constant C-rate based on the initial full-charge capacity and the initial charge current setting.

18. The at least one non-transitory computer readable storage medium of claim 17, wherein the instructions, when executed, cause a computing device to determine a subsequent full-charge capacity of the battery after the initial charge cycle, wherein the charge current is adjusted based on the subsequent full-charge capacity and the constant C-rate.

19. An apparatus comprising:
a charge cycle initiator to place a battery in a first constant voltage charging mode at a first predetermined voltage threshold during the beginning of a charging cycle;
a current decrease unit to monitor a diminishing current of the battery while the battery is in the first constant voltage charging mode during the beginning of the charging cycle; and
a mode modifier to place the battery in a constant current charging mode when the diminishing current falls to a first predetermined current threshold,
wherein the mode modifier is to place the battery in a second constant voltage charging mode at an end of the charge cycle in response to a rising voltage reaching a second predetermined voltage threshold different from the first predetermined voltage threshold.

20. The apparatus of claim 19, further including a voltage increase unit to monitor a rising voltage of the battery while the battery is in the constant current charging mode.

21. The apparatus of claim 19, further including a charge current adapter to adjust a charge current corresponding to the constant current charging mode based on a charge capacity of the battery.

22. The apparatus of claim 21, wherein the charge current adapter is to maintain a constant C-rate for the battery.

23. The apparatus of claim 21, wherein the charge current adapter includes:
   a capacity initializer to determine an initial full-charge capacity of the battery prior to an initial charge cycle;
   a current initializer to determine an initial charge current setting for the battery; and
   a C-rate unit to determine the constant C-rate based on the initial full-charge capacity and the initial charge current setting.

24. The apparatus of claim 23, wherein the charge current adapter further includes a capacity monitor to determine a subsequent full-charge capacity of the battery after the initial charge cycle, wherein the charge current is to be adjusted based on the subsequent full-charge capacity and the constant C-rate.

25. The apparatus of claim 19, wherein the charge cycle initiator is to place the battery in the first constant voltage charging mode in response to an initial burst charge causing a voltage of the battery to reach a level corresponding to the first constant voltage charging mode.

* * * * *